Nov. 16, 1965   J. W. C. BULLARD, JR   3,217,990
WINDING AND REELING APPARATUS
Filed April 26, 1961   5 Sheets-Sheet 2

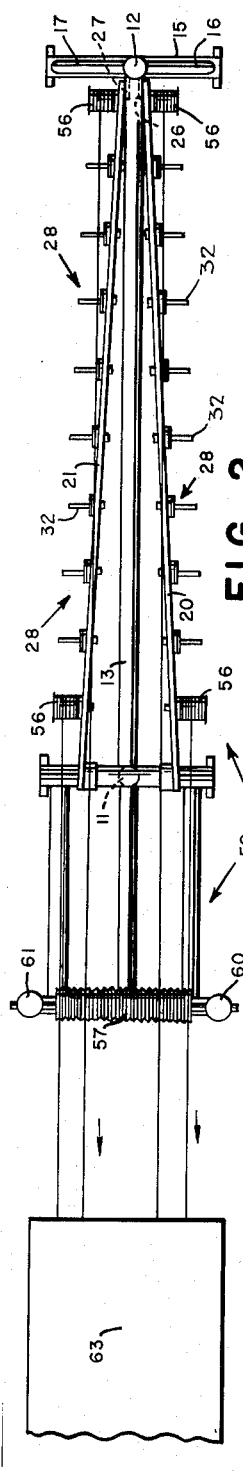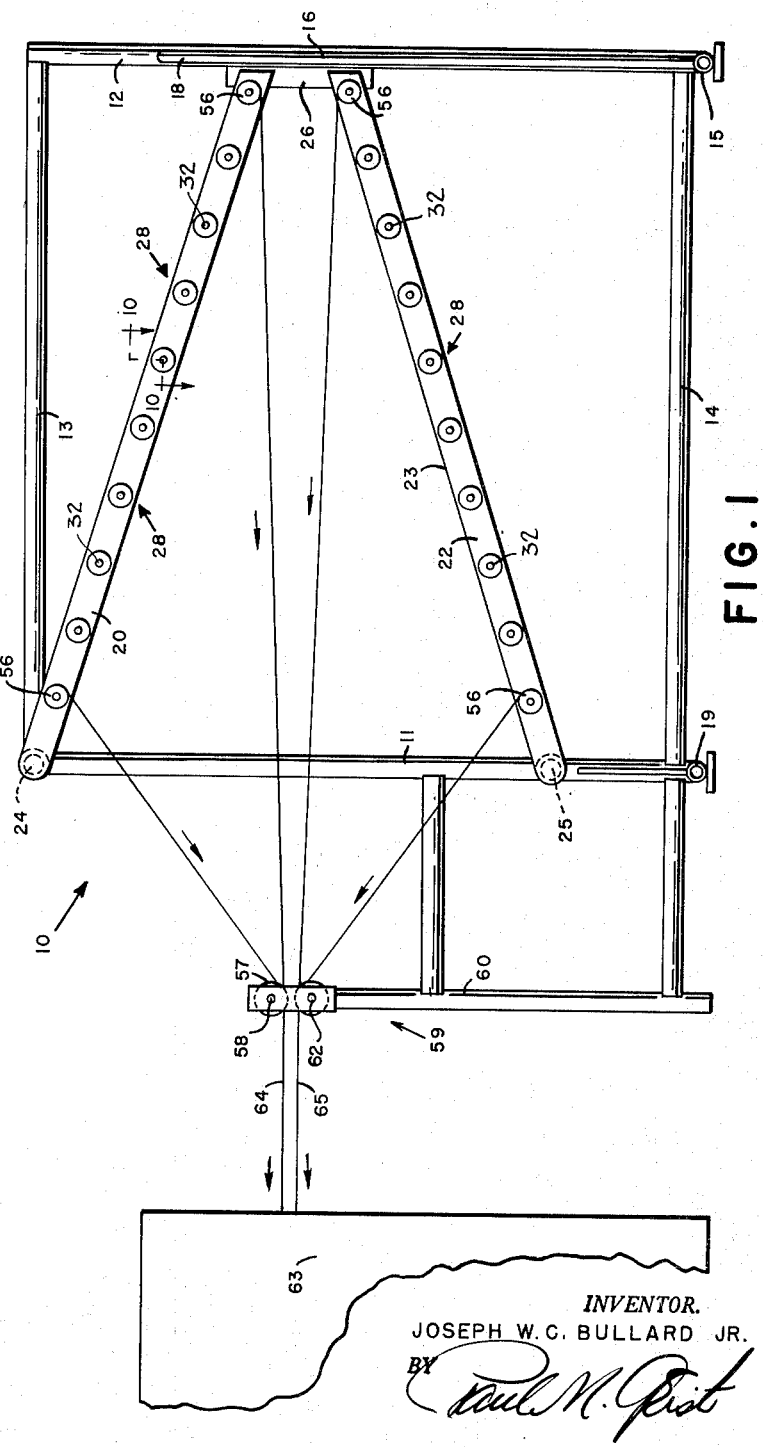

INVENTOR.
JOSEPH W. C. BULLARD JR.
BY
ATTORNEY

Nov. 16, 1965   J. W. C. BULLARD, JR   3,217,990
WINDING AND REELING APPARATUS
Filed April 26, 1961   5 Sheets-Sheet 3

INVENTOR.
JOSEPH W. C. BULLARD JR.
BY
ATTORNEY.

Nov. 16, 1965 J. W. C. BULLARD, JR 3,217,990
WINDING AND REELING APPARATUS
Filed April 26, 1961 5 Sheets-Sheet 4
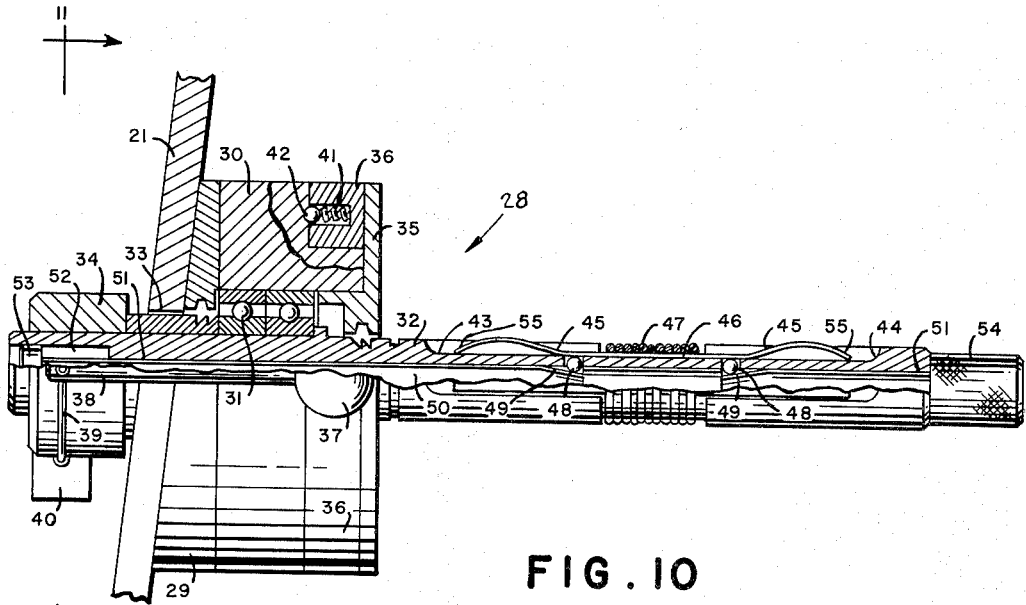
FIG. 10
FIG. 10A
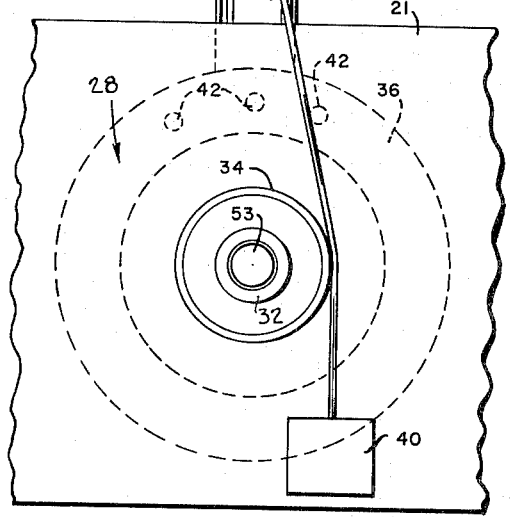
FIG. 11
INVENTOR.
JOSEPH W. C. BULLARD JR.
BY
ATTORNEY.

United States Patent Office 3,217,990
Patented Nov. 16, 1965

3,217,990
WINDING AND REELING APPARATUS
Joseph W. C. Bullard, Jr., 89 Westway Road,
Southport, Conn.
Filed Apr. 26, 1961, Ser. No. 105,662
6 Claims. (Cl. 242—25)

The present invention relates to apparatus for winding wire onto spools, and particularly to a new and improved wire spooling apparatus capable of precisely winding wire of very light gauge onto spools under a predetermined substantially constant tension.

In the electrical industry, the use of very fine gauge wire is becoming increasingly important in the manufacture of sensitive electrical apparatus. Wire having a diameter in the vicinity of a thousandth of an inch or so is required. While such wires are drawn accurately to desired diameters, they must be annealed prior to use. The annealing of such wires and their subsequent winding onto spools has created serious problems including the variation in cross section due to unequal or improper tension being applied to the annealed wire between the annealing furnace and the spool. Such variations in wire diameter cannot be tolerated in certain electrical equipment requiring straight line resistance curve characteristics.

Scratching of the surface of the wire often occurs in prior known devices, usually caused by the wire contacting metallic surfaces while it is being processed. This may occur due to the wire contacting the flanges of the spool from which it is being "payed off," or by contacting other metallic surfaces during processing. Another disadvantage of known apparatus is that the wire after processing is often wound onto a spool in a "softened" condition. Subsequent removal of the wire where varying tension of the wire may be encountered often causes the wire leaving the spool to sink down between lower adjacent convolutions, causing pinching of the wire and aggravating the tension variation.

An object of the invention is to provide a wire spooling apparatus in which a large number of spools of wire may be simultaneously wound under substantially constant tension.

Another object of the invention is to provide such a wire spooling apparatus in which the power source applying the necessary tension to pull the wires through the annealing furnace is applied between the furnace and the spools.

Still another object of the invention is to provide such a wire spooling apparatus in which the windup spools are driven in a manner to produce a predetermined tension on the annealed wire sufficient to produce sound spooling of the annealed wire.

Still another object of the invention is to provide such a wire spooling apparatus in which a traversing device acts simultaneously to track the wire onto a multiplicity of rotating spools in a manner to prevent irregular build-up at each flange as well as any place between the flanges.

Still another object of the invention is to provide such a wire spooling apparatus in which the spindles for supporting the spools maintain them in precise concentric arrangement with the spindles and such that the spools may be easily mounted on and removed from the spindles.

Still another object of the invention is to provide such a wire spooling apparatus in which very sensitive adjustable friction means may be applied to the pay-off spindles for any desired diameter wire.

Still another object of the invention is to provide such a wire spooling apparatus in which the drive for the various spindles receiving the wire is adjustable, so that a predetermined tension in the wire may be maintained at all times.

In one aspect of the invention, a pay-off stand may include four bars that extend from a vertical plane at the forward end of the pay-off stand and converge toward each other at a point rearwardly of the stand. Equally spaced, rotatable spindles may be mounted along each bar with their axes of rotation prependicular to the longitudinal centerline of the stand. These spindles receive spools of wire which is adapted to be fed to, and through, an annealing furnace. The arrangement of the spindles is such that as the wire of each spool is unwound in passing to the furnace, no wire comes in contact with any other wire, and no wire contacts the flanges of its spool as it is payed off or any other metallic surface. Additionally, due to the arrangement of the bars of the frame and the spindles on the bars, every spindle is freely accessible independently of every other spindle. This makes it possible to change a spool at any time independently of the operation of any other spindle.

In another aspect of the invention, variable friction-applying means may be provided for each spindle in the form of a weighted, freely suspended string or the like, in which the degree of wrap around a drum on the spindle may be varied to vary the resistance imparted to the unwinding of the spool of wire.

In still another aspect of the invention, the wires from the various spools may pass through an annealing furnace thence out of the furnace to two friction feeding means in the form of relatively large diameter spaced rolls on a vertical standard. The rolls may be vertically spaced on each side of the standard and may be driven by a variable speed transmission. The wires are adapted to wrap around two spaced rolls in S fashion and then extend to spools mounted on spindles supported by a take-up stand and arranged in spaced parallel relation on opposite sides of a gear box that is inclined upwardly from the front to the rear of the take-up stand.

In still another aspect, all of the take-up spindles may be driven from a common constant speed drive shaft extending upwardly within the gear box that supports the take-up spindles. Separate eddy-current clutches may be provided between the common drive shaft and each spindle. Each eddy-current clutch may include a potentiometer in its field circuit for varying the rotative torque applied to each spindle to provide a predetermined tension to its corresponding wire.

In still another aspect of the invention, a traversing frame may be mounted for transverse, reciprocable movement on the spindle take-up stand, and a wire feeding element together with adjustable tensioning means may be mounted along each side of the traversing frame above each spindle on which a spool is mounted to receive the annealed wire.

In still another aspect of the invention, each of the spool supporting spindles may be constructed with equiangularly spaced expanding means at axially spaced points along the spindle so that precise concentricity between the spindle and spool can be maintained.

The above, other objects and novel features of the invention will become apparent from the following specification and accompanying drawings which are merely exemplary.

In the drawings:

FIG. 1 is an elevational view of a pay-off stand for supporting rolls of wire to be heat treated and to which certain principles of the invention have been applied;

FIG. 2 is a top plan view of the stand shown in FIG. 1;

FIG. 10 is an enlarged sectional view taken substantially along line 10—10 of FIG. 1;

FIG. 10A is a linkage diagram of certain parts of FIG. 10;

FIG. 11 is an elevational view looking in the direction of the arrows along line 11—11 of FIG. 10.

Figure 4:
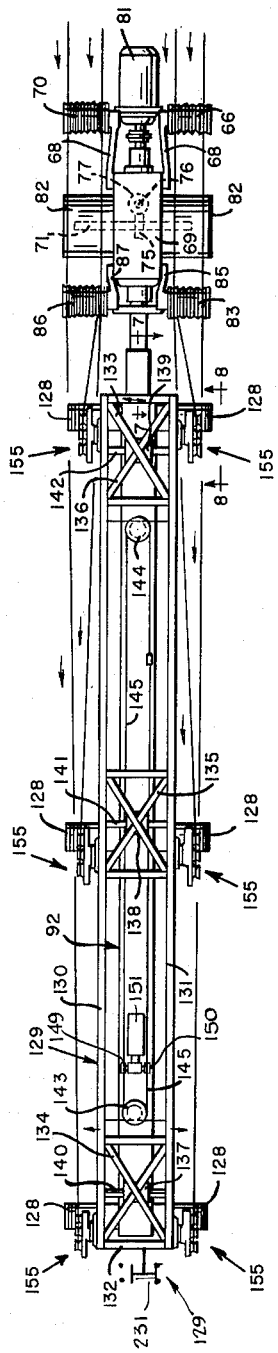
FIG. 4 is a top plan view of the apparatus shown in FIG. 3.

Referring to the drawings, and particularly to FIGS. 1 to 4, inclusive, the principles of the invention are shown as applied to a wire spooling apparatus comprising a payoff stand 10 on which may be mounted a large number of spools of wire to be unreeled. The frame 10 may include a pair of uprights 11, 12 joined at the top by a bar 13 and at the bottom by a bar 14. A transverse bar 15 at the bottom of upright 12 may be fixed to strengthening bars 16 and 17, which latter are connected to the upright 12 at the point 18. The upright 11 may be fixed to a transverse bar 19. The upright 11 is the forward end and upright 12 is the rear end of the stand 10. Four bars 20, 21, 22 and 23, the latter not shown since it is directly behind bar 22 in FIG. 1 and directly beneath bar 20 in FIG. 2, are connected to cross bars 24 and 25 fixed to upright 11. Bars 20-23 converge toward a common point rearwardly of the upright 12 but terminate at, and are fixed to, plates 26 and 27 fixed to upright 12.

At equal intervals along the bars 20-23, spool supporting spindle assemblies 28 are located. Referring to FIG. 10, the spindle assemblies may comprise a wedge-shaped base 29 fixed to the bar 21 and a flanged collar 30 fixed to the wedge-shaped base 29. Anti-friction bearing means 31 within the bore of the collar 30 may support for rotation a spindle 32 that may extend through a hole 33 within bar 21 and may support on its one end a drum 34 for a purpose to be described later. A disk 35 may be fixed to the collar 30, forming an annular channel with the flange of collar 30 for receiving a disk 36 having an arm 37 extending outwardly therefrom. Referring to FIG. 11, a rod 38 may extend from the arm 37 in parallel relation to the axis of spindle 32. Rod 38 may extend across the frame member 21 and support a flexible line 39 at the end thereof overlying drum 34 that is fixed to spindle 32. A weight 40 may be attached to the end of line 39. Spring pressed detent or ball means 41 may be mounted in disk 36, and it may cooperate with arcuately spaced recesses 42 in collar 30. The construction is such that handle 37 may be moved to a plurality of different arcuate positions at which the degree of wrap of the line 39 about the drum 34 will vary, thereby providing a simple expedient to vary the frictional drag of spindle 32 to cause wire payoff from a spool on spindle 32 to be controllable.

The bores of the spool supporting the wire to be treated often vary considerably. In order to ensure concentricity between the spool bore and the axis of spindle 32, the latter is provided with axially spaced, axially extending grooves 43 and 44. There are three grooves 43 and three grooves 44 arranged at equal intervals about the axis of spindle 32. Leaf spring members 45 may have a center portion 46 that is fixed to the periphery of spindle 32 and is shown as being held thereto by a wire 47 spirally wound thereabout. There are three springs 45, and each comprises two formed portions that rest within grooves 43 and 44. There may be a ball 48 within a radial passage for each of the grooves 43 and 44, and balls 48 may cooperate with cams 49 formed on an axially shiftable shaft 50 that passes through an axial passage 51 within spindle 32. The passage 51 may be counterbored at 52 to receive a collared end 53 of the shaft 50. A knurled head member 54 may be fixed to the end of shaft 50 opposite that containing collar 53. Referring to FIG. 10A, the relationship between Y, X and Z will be such that upon the radial movement of ball 48, the crowns of spring 45 will move radially sufficiently to engage with adequate force, the bore of commercial spools.

In the position of the parts shown in FIG. 10, the springs 45 are retracted within their grooves 43 and 44 so that a spool can be inserted on spindle 32. With a spool on spindle 32, knurled head 54 is pulled rightwardly, causing cams 49 to force balls 48 radially outwardly so that both ends of springs 45 are raised above the periphery of spindle 32 while their ends 55 still remain beneath the periphery of spindle 32 within grooves 43 and 44. This is important so that the end of a spool will not inadvertently abut such end in mounting a spool on the spindle should the cams 49 inadvertently be left in a position raising the balls 48.

Referring again to FIGS. 1 and 2, there are shown ten spindle assemblies 28 equally spaced along each of the bars 20, 21, 22 and 23, each of which has mounted on its spindle 32 a spool 56 of wire to be payed off. The wire leading from each spool 56 on the bars 20 and 21 passes beneath a grooved guide pulley 57 freely rotatable on a shaft 58 supported by a frame 59 including uprights 60 and 61. The wire from each spool 56 on bars 22 and 23 passes over a grooved guide pulley 57 freely rotatable on a shaft 62 also mounted in frame 59. Shafts 58 and 62 are parallel to each other and also parallel to the axes of spindles 32.

The pulleys 57 for receiving the wire from the leftmost spools 56 are in line with the midpoint between the flanges of said spools, and the spacing of frame 59 from upright 11 is such that as the wire is payed off from these leftmost spools 56, it will not contact either of the flanges of the spools. The pulleys 57 for the succeeding spools 56, rightwardly of the leftmost spools 56, are located progressively nearer the midpoint of shafts 58 and 62. However, since these latter spools are spaced farther and farther from the frame 59, and also because the axes of said spools are at right angles to the centerline of bar 13, the wires from these latter spools also pay off without contacting the flanges of these spools.

In other words, the combination of the rearwardly converging bars 20 and 21 together with their downward inclination, the arrangement of the axes of spindles 32 and the arrangement of the pulleys 57 all contribute to the accessibility of any of the spools independently of every other spool.

Figure 3:
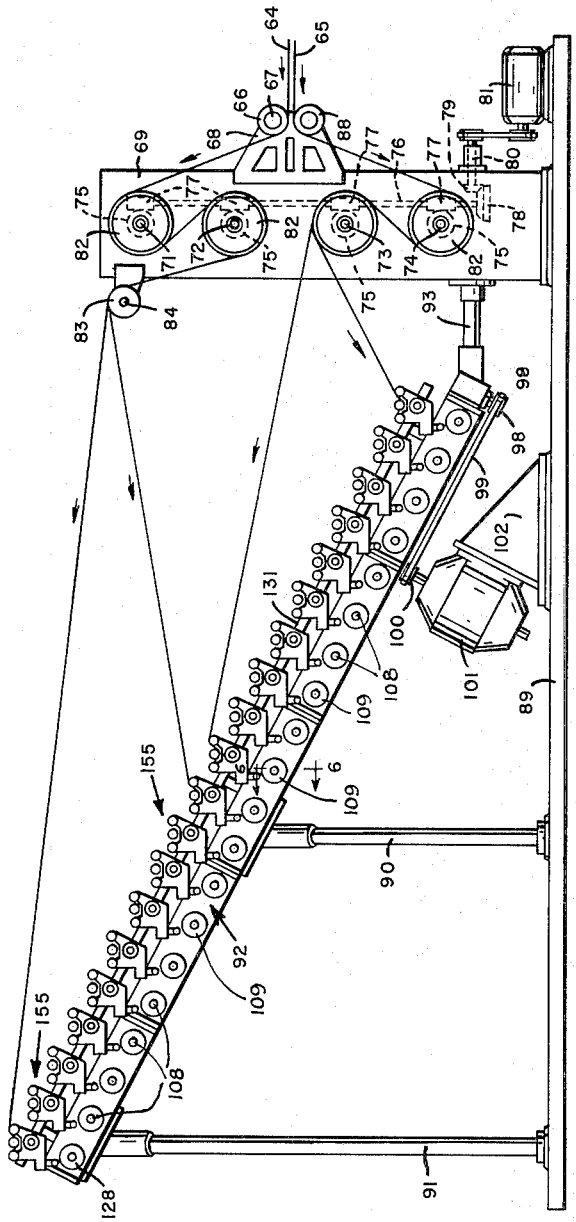
FIG. 3 is an elevational view of a take-up and wire feeding device to which certain of the principles of the invention have been applied.

The forty wires from the forty spools 56 may pass into an annealing furnace 63. Twenty of these wires lie in each of two closely spaced horizontal planes 64 and 65. Referring to FIGS. 3 and 4, ten of the twenty wires within plane 64 pass beneath grooved pulleys 66 freely rotatable on a shaft 67 supported in a bracket 68 fixed to a hollow standard 69. The other ten wires in plane 64 pass beneath grooved pulleys 70 (FIG. 4) freely rotatable on a shaft coaxial with shaft 67.

The hollow standard 69 may include four vertically spaced, horizontal shafts 71, 72, 73 and 74 extending therethrough and beyond each side thereof. The shafts 71 to 74 may each include a worm gear 75 fixed to it and located within the hollow standard 69. A vertically disposed drive shaft 76 within standard 69 may have worms 77 thereon mating with gears 75 in self-locking fashion, and a bevel gear 78 may be provided at the bottom of shaft 76. Gear 79 meshes with bevel pinion 79 on a shaft 80 mounted in a bearing bracket fixed to an outside surface of standard 69. A variable speed power source 81 may be employed to drive shaft 71 to 74 at a predetermined rate of speed.

A drum 82 may be fixed to each end of shafts 71 to 74. Accordingly, there are four sets of two axially aligned drums 82 each arranged in vertically spaced, horizontal planes.

The ten wires that pass beneath pulleys 66 pass in S fashion over the top and beneath the bottom of the drums 82 on the ends of shafts 71 and 72 on the one side of standard 69, thence upwardly over a set of grooved pulleys 83 that are freely rotatable on a shaft 84 supported by a bracket 85 fixed to standard 69. The ten wires that pass beneath pulleys 70 follow the same path over the top and beneath the bottom of drums 81 on the ends of shafts 71 and 72 opposite the ends supporting the drums 82 that engage the wires from pulleys 66. As the ten wires from pulleys 70 leave the bottom of drum 82, they pass upwardly over a set 86 of grooved pulleys on a shaft coaxial with shaft 84 and mounted in a bracket 87 fixed to standard 69.

In a similar fashion, ten of the wires in plane 65 pass over the top of a set of grooved pulleys 88 on each side of the standard 69, and pass beneath the bottom, thence over the top of drums 82 on shafts 74 and 73 on each side of standard 69 in an S pattern.

From the foregoing it is evident that the eight drums 82 provide a predetermined pulling action on the forty wires to pull them through the furnace 63 at a predetermined speed depending upon the setting of the variable speed motor 81.

Figure 7:
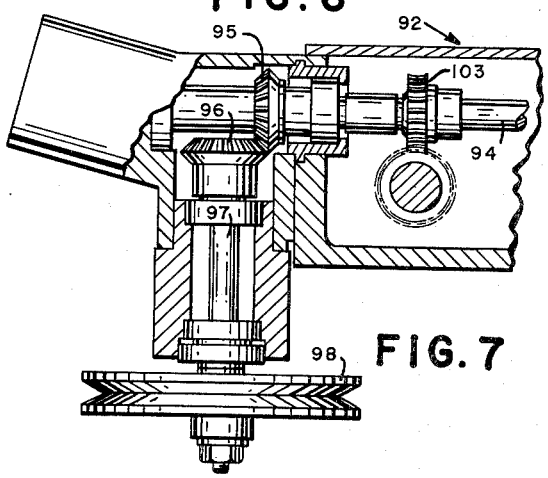
FIG. 7 is a sectional elevational view taken substantially along line 7—7 of FIG. 4.

Referring to FIG. 3, a base 89 that supports standard 69 and motor 81 may support frame means 90 and 91, which means supports an inclined hollow frame member 92 that is anchored at its lower end to standard 69 by a bracket 93. Referring to FIG. 7, a shaft 94 extends throughout the length of, and in the interior of member 92. The lower end of shaft 94 is provided with a bevel gear 95 that meshes with a bevel gear 96 fixed to one end of a shaft 97, to the other end of which a grooved drive pulley 98 is fixed. The pulley 98 is connected by a belt 99 (FIG. 3) to a pulley 100 fixed to the output shaft of a constant speed motor 101 that is mounted on a bracket 102 fixed to base 89.

Figure 6:
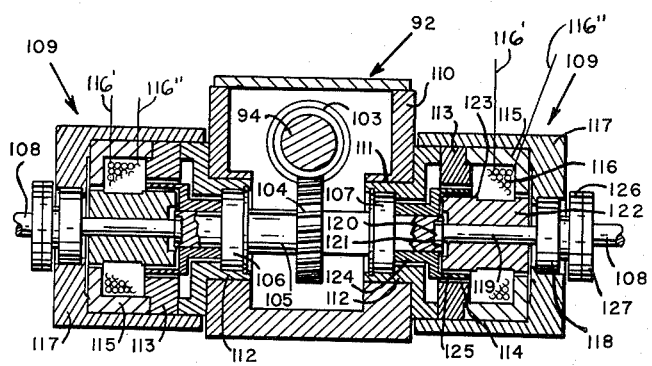
FIG. 6 is a sectional view taken substantially along line 6—6 of FIG. 3.

The shaft 94 may have fixed to it twenty helical gears 103 which are equally spaced throughout the entire length of said shaft. Referring to FIG. 6, each gear 103 meshes with another helical gear 104 fixed to a shaft 105 that is journaled in anti-friction bearings 106 and 107. Each end of the shaft 105 drives a spindle 108 substantially identical with the spindle assembly 28 shown in FIG. 10. The spindles 108 may be driven through eddy-current clutches 109, only one of which will be described specifically. The one wall 110 of the hollow member 92 has a bored passage 111 that fixedly receives a flanged sleeve member 112 of non-magnetic material, within which the one race of bearing 107 is mounted. A member 113 of magnetic material may be fixed to the flange of member 112, and its inner peripheral surface 114 may be provided with equally spaced transverse grooves forming poles for a purpose to be described later. A cup-shaped member 115 of magnetic material may be fixed to the member 113, and the void within member 115 may enclose a winding 116 adapted to be supplied with direct current at predetermined voltage through lines 116' and 116". A housing 117 of non-magnetic material may surround the elements 112 to 115 and be fixed to member 112 to encase the stator of the eddy-current clutch. The housing 117 may have an anti-friction bearing 118 in a bore that is concentric with the axis of shaft 105, and a shaft 119 may extend through bearing 118 and its one end 120 may be journaled as a pilot in a pilot bearing 121 in the end of shaft 105. A rotor 122 of magnetic material may be keyed to shaft 119 and it may include an outer peripheral portion 123 that includes axial grooves forming poles adapted to cooperate with the poles on the inner periphery of member 113. To complete the eddy-current clutch, a cup-shaped member 124 of magnetic material may be keyed to shaft 105 and it may include a thin flange 125 that is received between the grooved portions of members 113 and 122 with a very small clearance between each member. The inner surface of the thin flange 125 may be copper plated. The members 113, 115 and 122 provide a magnetic coupling when a voltage drop is applied to the coil 116. With coil 116 energized, rotation of shaft 105 and cup 124 causes eddy-currents to be generated in the member 122. These eddy-currents form a pattern of magnetic poles on the outer surface of member 122. Magnetic attraction between the poles on member 113 and 122 causes the development of torque in shaft 119. Varying the excitation of the coil 116 changes the magnetic field strength, which in turn proportionately affects the torque developed in shaft 119.

The end of shaft 119 is provided with a flange 126 to which a flange 127 may be attached, which latter forms the support for the spindle 108.

From the foregoing it is evident that rotation of shaft 94 at a constant speed by motor 101 and providing a predetermined direct current in coils 116 by means of a rheostat in series with coils 116 makes it possible to apply to the twenty spindles 108 on each side of the member 92 an individual pre-selected torque, all for a purpose to be described later.

Windup spools 128 identical with spools 56 (FIG. 2) may be applied to spindles 108 in the same way they are applied to the spindle assemblies 28. Problems arise in feeding the annealed wires from the standard 69 to the spools 128. These problems include maintaining the wires under just enough tension to prevent slack developing in them as they are fed to their respective spools, and preventing any buildup of tension beyond this point. The previously described variable torque eddy-current clutch assemblies can be employed to maintain the torque at its optimum value as the diameter of the spooled wire increases. Another problem encountered is the requirement for precise laying down of succeeding layers of wire on the spools 128 so that there is no buildup as the wire traversing mechanism reverses at each flange of the spools 128.

Figure 5:
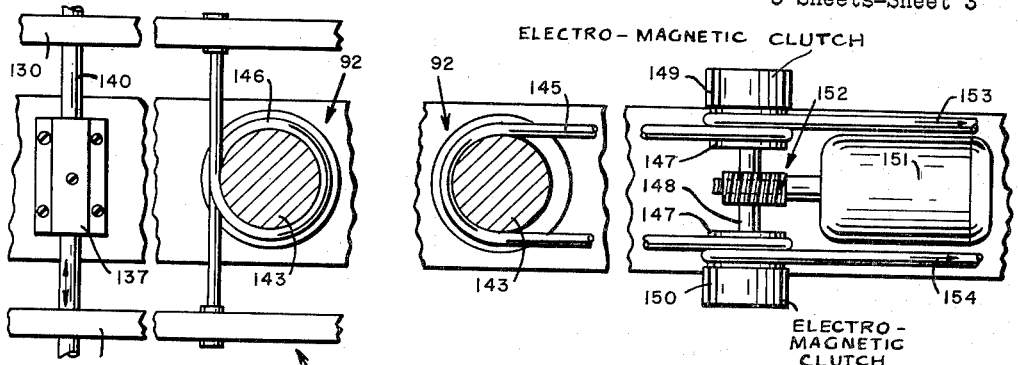
FIG. 5 is an enlarged view of part of the apparatus shown in FIG. 4.

Referring to FIG. 4, a frame 129 may comprise two sides 130, 131 extending throughout substantially the length of hollow member 92, and they are joined at their ends by cross members 132, 133. Cross bracing 134, 135 and 136 may provide rigidity to the frame 129, and it may be made of aluminum or other light metal in order to reduce to a minimum its inertia. Linear circulating ball bearings 137, 138 and 139 may be mounted along member 92 for receiving shafts 140, 141 and 142 that extend between sides 130, 131 of frame 129. Capstans 143 and 144 may be mounted in anti-friction bearings on the member 92, and a cable such as a woven wire cable may form a continuous belt 145 extending between the capstans 143 and 144. Referring to FIG. 5, wherein the capstan 143 is shown displaced for reasons of clarity, the capstan 143 also includes a flexible cable 146 similar to cable 145 that is wrapped 360° around it, with its opposite ends fixed to sides 130 and 131. Each strand of cable 145 is wrapped around a drum 147 that is freely rotatably mounted on a shaft 148 that extends between, and is journaled in, bearings on member 92. The shaft 148 supports magnetic clutches 149 and 150, having portions keyed to shaft 148. The shaft 148 is rotated unidirectionally by a motor 151 through a self-locking worm drive 152. This arrangement permits reversal of motion of frame 129 without any backlash affecting its operation. In other words, with clutch 149 energized and clutch 150 de-energized, cable 145 moves in the direction of arrow 153; and with clutch 150 energized and clutch 149 de-energized, cable 145 moves in the direction of arrow 154. This reversal of motion of cable 145 is occasioned with motor 151 rotating always in the same direction. Reversal of the linear movement of cable 145 reverses the rotation of the capstans 143 and 144 to cause frame 129 to reciprocate. Should there be any resistance to the reciprocation of frame 129, it will not jump ahead because of the self-locking nature of the worm drive 152 between motor 151 and shaft 148. Furthermore, the motor 151 may be shimmed to provide backlash-free meshing between the worm and worm gear of drive 152. The magnetic clutches 149 and 150 may be actuated through a switch having contacts that make and break simultaneously so that instantly upon de-energizing one clutch, the other is energized.

The reciprocative stroke of the frame 129 and the diameter of capstans 143, 144 may be such that the cables may be anchored to them and still function properly.

Figure 9:
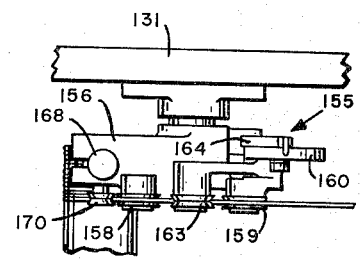
FIG. 9 is a top plan view of the apparatus shown in FIG. 8.
Figure 8:
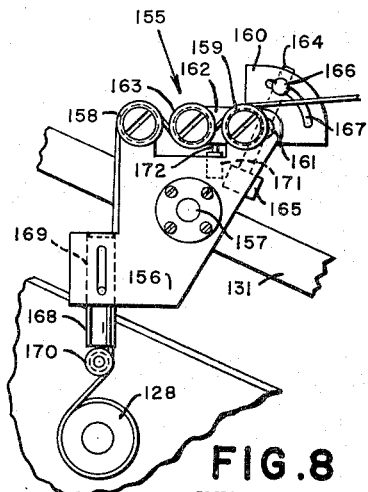
FIG. 8 is an enlarged elevational view looking in the direction along line 8—8 of FIG. 4.

Referring again to FIG. 4, sides 130 and 131 of frame 129 may support pivotally mounted wire needle assemblies 155 directly above a corresponding spindle 108. Accordingly, there are forty such assemblies 155, only one of which will specifically be described. Referring to FIGS. 8 and 9, the assembly 155 may comprise a plate 156 that is fixedly mounted on a pin 157 extending transversely outwardly from side 131 and rigidly fixed thereto.

The plate 156 may support grooved rollers 158 and 159 in spaced relation. A quadrant 160 may be pivotally mounted on a pin 161 attached to plate 156, and it may include an arm 162 that rotatably supports a grooved dancer roller 163 between the spaced rollers 158 and 159. The quadrant 160 may also support an arm 164 also pivoted on pin 161, and it may include a weight 165 at its one end. The other end of arm 164 may have a pin 166 that cooperates with an arcuate slot 167 in quadrant 160 for facilitating the pivotal adjustment of arm 164 relative to quadrant 160. In this way, the grooved roll 163 is caused to turn counterclockwise (FIG. 8) to a greater or lesser degree.

The plate 156 may also support a wire guiding element 168 for vertical adjustment within a bore 169 in plate 156, and element 168 may rotatably support a grooved roll 170. The construction and arrangement of the parts are such that a wire is fed over the top of roller 159, beneath roll 163, over the top of roll 158, thence downwardly along the side of element 168, across roll 170, thence onto spool 128.

The plate 156 may also support a normally open switch 171 having a finger 172 that normally is held in a position (opening switch 171) by the arm 162 when the proper tension is applied to the wire. Should the tension decrease in any wire as the spool fills up, its corresponding arm 162 will fall, thereby closing switch 171 which may energize an alarm light or buzzer so that the operator may adjust the rheostat for the corresponding clutch 109. Alternatively, it may activate a motor for actuating the rheostat in series with the winding 116 of the corresponding eddy-current clutch 109 to thereby increase the torque applied to the corresponding spindle 108 in order to maintain the wire being wound onto the spool at the desired tension.

Referring again to FIGS. 3 and 4, the outermost wires in the group of twenty wires in plane 64 may be threaded through the needle assemblies 155 at both sides of frame 129 farthest from the standard 69. Each succeeding wire of this group inwardly of the outermost wires may be threaded through the assemblies 155 progressively nearer to the standard 69. This will consume the ten assemblies 155 on each side of frame 129 located the farthest from standard 69.

The outermost wires of the group of twenty within plane 65 may be threaded through the tenth assemblies 155 from the standard 69 on each side of frame 129, and each inwardly succeeding wire of this group may be threaded through the assemblies 155 on each side of frame 129 progressively nearer standard 69.

Figure 12:
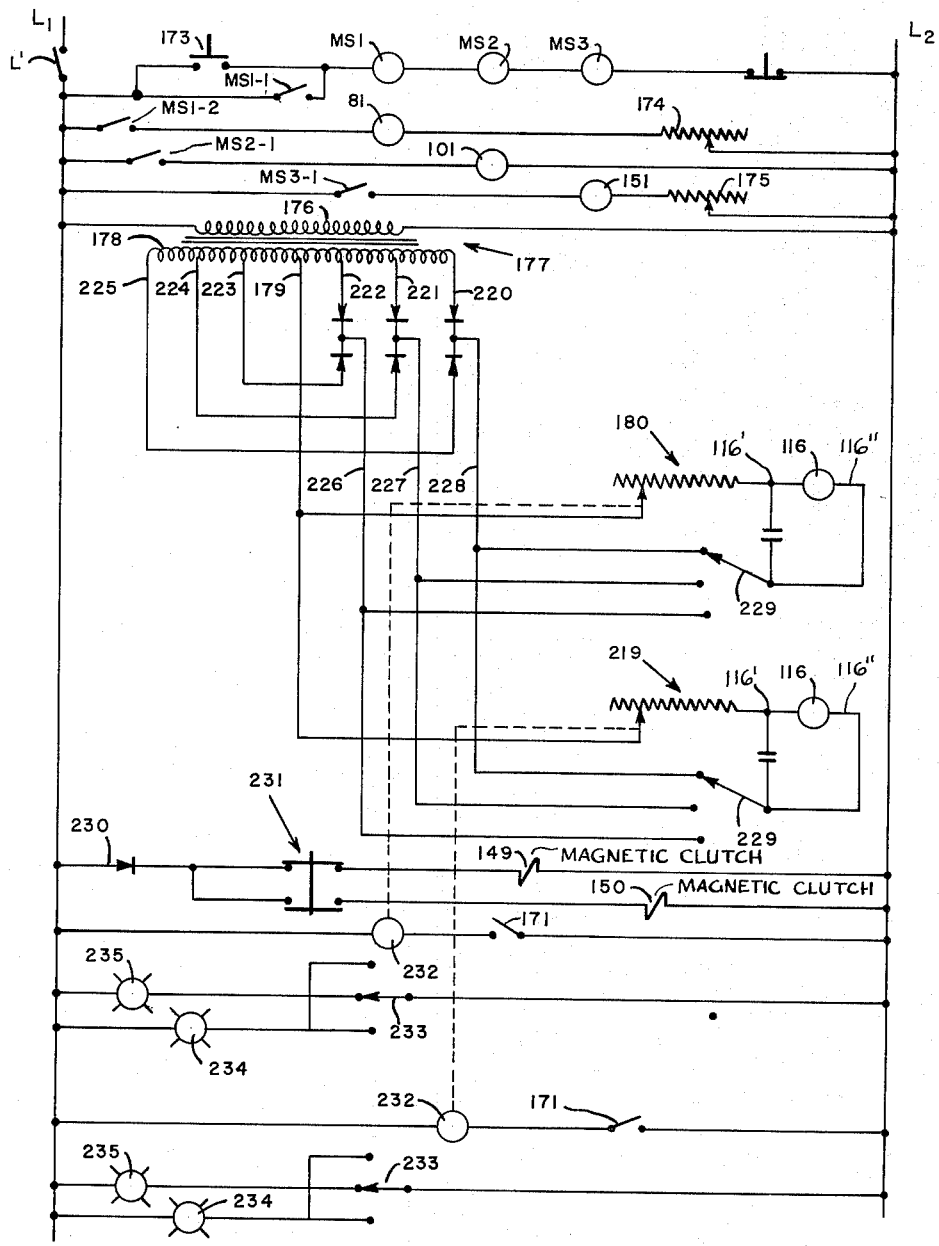
FIG. 12 is a wiring diagram for the machine shown in FIGS. 1 to 11.

Referring to FIG. 12, with main switch L' closed, closing a push button switch 173 energizes three magnetic starters MS1, MS2 and MS3. Energizing MS1 starter closes MS1–1 contacts, thereby holding the three starters energized when switch 173 is released. Energizing starters MS1, MS2 and MS3 closes contacts MS1–2, MS2–1 and MS3–1. Closing the MS1–2 contacts energizes variable speed motor 81 through a potentiometer 174. Closing contacts MS2–1 energizes constant speed motor 101. Closing contacts MS3–1 energizes variable speed electric motor 151 through a potentiometer 175.

Closing main switch L' also energizes the primary 176 of a transformer 177. The secondary 178 of transformer 177 has a center tap 179 providing a common connection for the arms of potentiometers 180 to 219, only the first and last of which are shown in FIG. 12. Each of the potentiometers 180 to 219 controls the excitation of its corresponding coil 116 of its corresponding eddy-current clutch. The secondary 178 may be provided with other taps 220 to 225 arranged to supply direct current to lines 226, 227 and 228. These lines may be connected to three terminals on manually operated switches 229 for each of the potentiometers 180 to 219. Accordingly, by adjusting the switch 229, a predetermined voltage, which may be varied from substantially zero, may be applied to the coil 116 of any of the eddy-current clutches in order to provide a desired tension in the wire being wound onto the spool controlled by said clutch.

Direct current may be applied to the magnetic clutches 149 and 150 by a rectifier 230 through a limit switch 231. In the condition of switch 231, magnetic clutch 149 is energized while 150 is de-energized. Accordingly, the carriage 129 (FIG. 5) is traversing upwardly on the drawing. When the carriage 129 arrives at the end of its travel, switch 231 is moved to a position energizing magnetic clutch 150 and de-energizing clutch 149. This causes instantaneous reversal of movement of carriage 129 as motor 151 continues to rotate in the same direction.

A small electric motor 232 may be drivingly connected to the arm of each of the potentiometers 180 to 219, inclusive. In the event the tension of any of the wires being wound decreases, the grooved roll 163 (FIG. 8) will lower, causing the corresponding switch 171 to close to thereby energize the corresponding motor 232. Accordingly, the motor 232 that is energized will move the arm of its potentiometer to increase the excitation in the corresponding coil 116 of the corresponding eddy-current clutch. This will increase the tension on the corresponding wire, raising its grooved dancer roll 163, thereby opening contacts 171 and stopping motor 232.

An indicating system may be provided for indicating the condition of each wire being spooled. It may comprise a three-position switch 233, two contacts of which are in parallel and connected to a red light 234; while the center contact is connected to a green light 235. With the switch 233 in the condition shown, proper tension is being applied to the wire being spooled with which it cooperates. Should the grooved dancer roll 163 (FIG. 8) either rise or fall, red light 234 will light, indicating the need of adjustment of the corresponding potentiometer 180 to 219. Only the first and last of the forty switches 233 are shown in FIG. 12.

Although the various features of the new and improved spooling apparatus have been shown and described in detail to fully disclose one embodiment of the invention, it will be evident that changes may be made in such details and certain features may be used without others without departing from the principles of the invention.

What is claimed is:

1. In a winding machine, a base; a frame member connected to said base; equally spaced, transversely aligned pairs of spindles mounted along said frame member; a traversing carriage extending substantially the length of said frame member and mounted on said frame member for transverse reciprocable motion; a rotatable capstan at each end of said frame member; a flexible cable making a complete turn about each of said capstans and having its ends attached to opposite sides of said carriage; another flexible cable connecting said capstans and having each of its reaches connected to elements of separate magnetic clutch means; a uni-directional motor for rotating said clutch means; and limit switch means responsive to the movement of said carriage for simultaneously energizing and de-energizing said separate clutch means at the end of each traverse motion of said carriage.

2. In a winding machine, a base; a frame member connected to said base; equally spaced, transversely aligned pairs of spindles mounted along said frame member; a traversing carriage extending substantially the length of said frame member and mounted on said frame member for transverse reciprocable motion; rotatable capstan at each end of said frame member; a flexible cable making a complete turn about each of said capstans and having its ends attached to opposite sides of said carriage; another flexible cable connecting said capstans and having each of its reaches connected to elements of separate magnetic clutch means; a uni-directional motor for rotating said clutch means; limit switch means responsive to the movement of said carriage for simultaneously energizing and de-energizing said separate clutch means at the end of each traverse motion of said carriage; and worm gear drive means between said uni-directional motor and said magnetic clutch means.

3. In a winding machine, a frame member; equally spaced, transversely aligned pairs of spindles mounted along said frame member; common constant speed driving means for all of said spindles; eddy-current clutch means between said common driving means and each spindle; potentiometer means in the field circuit of each clutch means; a traversing carriage on said frame member; a wire guide element on said carriage above each spindle on said frame member; dancer roll means forming wire guiding means leading to each of said elements; power means for varying the potentiometer of each of said clutch means; and means responsive to the movement of each of said dancer roll means for energizing its corresponding power means.

4. In a winding machine, a frame member; equally spaced, transversely aligned pairs of spindles mounted along said frame member; common constant speed driving means for all of said spindles; eddy-current clutch means between said common driving means and each spindle; potentiometer means in the field circuit of each clutch means; a traversing carriage on said frame member; a wire guide element on said carriage above each spindle on said frame member; dancer roll means forming wire guiding means leading to each of said elements; indicating means for each of said spindles; and means responsive to the movement of each of said dancer roll means for energizing its corresponding indicating means.

5. In a winding machine, a base; a standard at one end of said base; a frame member connected to said base and standard and inclining from one end to the other end of said base; equally spaced, transversely aligned pairs of spindles mounted along said inclined frame member; a traversing carriage extending substantially the length of said frame member and mounted on said frame member for transverse reciprocable motion; a rotatable capstan at each end of said frame member; a flexible cable making a complete turn about each of said capstans and having its ends attached to opposite sides of said carriage; another flexible cable connecting said capstans and having each of its reaches connected to elements of separate magnetic clutch means; a uni-directional motor for rotating said clutch means; and limit switch means responsive to the movement of said carriage for simultaneously energizing and de-energizing said separate clutch means at the end of each traverse motion of said carriage.

6. In a winding machine, a base; a standard at one end of said base; a frame member connected to said base and standard and inclining from one end to the other end of said base; equally spaced, transversely aligned pairs of spindles mounted along said inclined frame member; a traversing carriage extending substantially the length of said frame member and mounted on said frame member for transverse reciprocable motion; a rotatable capstan at each end of said frame member; a flexible cable making a complete turn about each of said capstans and having its ends attached to opposite sides of said carriage; another flexible cable connecting said capstans and having each of its reaches connected to elements of separate magnetic clutch means; a uni-directional motor for rotating said clutch means; limit switch means responsive to the movement of said carriage for simultaneously energizing and de-energizing said separate clutch means at the end of each traverse motion of said carriage; and worm gear drive means between said uni-directional motor and said magnetic clutch means.

References Cited by the Examiner

UNITED STATES PATENTS

| | | | |
|---|---|---|---|
| 1,166,948 | 1/1916 | Underhill | 242—25 |
| 1,678,710 | 7/1928 | Selvig | 242—68.3 X |
| 2,132,055 | 10/1938 | Stansfield | 242—139 |
| 2,153,996 | 4/1939 | Selvig | 242—25 |
| 2,254,221 | 9/1941 | Hubbard | 242—25 |
| 2,257,414 | 9/1941 | Garcia | 242—139 |
| 2,493,259 | 1/1950 | Mooney | 242—156 |
| 2,607,541 | 8/1952 | Morgan et al. | 242—25 |
| 2,717,125 | 9/1955 | Rayburn | 242—25 |
| 2,868,467 | 1/1959 | Lewis | 242—25 |
| 2,877,963 | 3/1959 | Hayden | 242—156 |
| 2,923,489 | 2/1960 | Bunch | 242—68.3 |
| 2,928,620 | 3/1960 | Stavrakis | 242—68.3 |
| 2,955,770 | 10/1960 | Ensor | 242—25 |

MERVIN STEIN, *Primary Examiner.*

JOSEPH P. STRIZAK, *Examiner.*